(12) United States Patent
Giraud et al.

(10) Patent No.: US 7,308,503 B2
(45) Date of Patent: Dec. 11, 2007

(54) FORWARDING OF IP PACKETS FOR ROUTING PROTOCOLS

(75) Inventors: Alain Giraud, Igny (FR); Laurent Cosson, Marolles en Hurepoix (FR); Jean-Pierre Rombeaut, Maubeuge (FR); Yves Saintillan, Massy (FR)

(73) Assignee: Alcatel, Paris (FR)

( * ) Notice: Subject to any disclaimer, the term of this patent is extended or adjusted under 35 U.S.C. 154(b) by 764 days.

(21) Appl. No.: 10/265,674

(22) Filed: Oct. 8, 2002

(65) Prior Publication Data
US 2003/0093557 A1 May 15, 2003

(30) Foreign Application Priority Data
Oct. 30, 2001 (EP) ................................ 01440368

(51) Int. Cl.
*G06F 15/16* (2006.01)
*G06F 15/177* (2006.01)
(52) U.S. Cl. ....................... 709/230; 709/220
(58) Field of Classification Search ............... 709/220, 709/230
See application file for complete search history.

(56) References Cited

U.S. PATENT DOCUMENTS

| | | | | |
|---|---|---|---|---|
| 5,473,599 A * | 12/1995 | Li et al. | ....................... | 370/219 |
| 6,049,524 A * | 4/2000 | Fukushima et al. | .......... | 370/220 |
| 6,567,851 B1 * | 5/2003 | Kobayashi | ................... | 709/228 |
| 6,751,191 B1 * | 6/2004 | Kanekar et al. | ............. | 370/217 |
| 6,854,072 B1 * | 2/2005 | Cagle et al. | ................... | 714/15 |
| 2003/0046604 A1 * | 3/2003 | Lau et al. | ...................... | 714/11 |

FOREIGN PATENT DOCUMENTS

| | | |
|---|---|---|
| EP | 0 605 339 A2 | 7/1994 |
| WO | WO 00/51290 A2 | 8/2000 |

OTHER PUBLICATIONS

Coulouris, George, Distributed Systems Concepts and Design, 1998, Addison Wesley, 2nd Edition, p. 339.*
P. Srisuresh: "Traditional IP Network Address Translator" Internet Article, Online! Jan. 1, 2001, XP00205497, p. 1-16.
Aweya J: "On the design of IP routers Part 1: Router architectures" Journal of Systems Architecture, Elsevier Science Publishers BV., Amsterdam, NL, vol. 46, no. Apr. 2000, pp. 483-511, XP004190486.

* cited by examiner

*Primary Examiner*—Valencia Martin-Wallace
*Assistant Examiner*—Alan S Chou
(74) *Attorney, Agent, or Firm*—Sughrue Mion PLLC

(57) ABSTRACT

A forwarding engine of a router device may replace addresses of some IP packets by virtual ones such to mask the active routing daemon. This is used in unicast regime when said forwarding engine forwards incoming IP packets from neighbor routers to said routing daemon. It is also used in unicast as well as in multicast regime in the opposite case. A standby routing daemon may also be used on another processor by affecting same virtual addresses for its ports as the first active routing daemon. In a case of failure of the first active routing daemon, a controller will switch said standby routing daemon to be the new active daemon connected to the forwarding engine. A CompactPCI bus can be advantageously used. In that case, the forwarding engine is a peripheral board of the controller of that CompactPCI.

12 Claims, 1 Drawing Sheet

FORWARDING OF IP PACKETS FOR ROUTING PROTOCOLS

TECHNICAL FIELD OF THE INVENTION

The present invention relates to the continuity service of Internet Protocol IP routing. More specifically, the invention provides a router device for IP routing having an active routing daemon running on a processor board connected to a forwarding engine containing at least two outgoing ports and forwarding incoming IP packets from neighbor routers to said routing daemon or outgoing IP packets from said routing daemon to neighbor routers. The invention further provides a method for forwarding incoming as well as outgoing IP packets from respectively neighbor routers to some active routing daemon and vice versa.

The invention is based on a priority application EP 01 440 368.7 which is hereby incorporated by reference.

BACKGROUND OF THE INVENTION

A router device or router—a level three IP packet switch formerly called a gateway in the literature—contains a plurality of connections with other routers. These connections can be of different natures depending of the used protocol e.g. a point to point or a multi-access one, latter being used for an Ethernet based network. The use of a protocol like OSPF (Open Shortest Path First) protocol which is a TCP/IP (Transmission Control Protocol over Internet Protocol) will permit to the routers to get enough information about the network for a successful forwarding of the received packets.

The routing when using e.g. OSPF protocol will be dynamical i.e. a change in the topology of the network will be taken into account in a dynamic way. It implies that some exchange of information must be performed regularly between the routers so to update a database of each router concerning information of an actual status of the network.

It may be necessary according to the type of the connection and the used routing protocol to build a so-called adjacency process between several different routers. In that case, routers that become adjacent will have some information concerning the state of the network so to be able to forward any incoming packets. These information are organized in a routing table. And due to the dynamical mode, these routing tables must be updated regularly. But to optimize the traffic of packets, such adjacency process may be done only between a router and a designated neighbor router. The updates are performed via exchange of messages called Link State Advertisement LSA containing some information about the network. The routing tables are then calculating by each router using that information.

A lot of applications must be highly available. But due to potential hardware or software failures, desktop systems like routers are not, strictly speaking highly available. A way to improve the situation is to use a clustering model i.e. use a group of redundant and autonomous server platforms including routers in a networked configuration. In that case, if one autonomous platform fails, a standby platform will take its place. But such model has the big drawback that a takeover time is of the order of 30 to 90 seconds. During that takeover time, all packets will be lost which is an unsatisfactory situation for many application.

In U.S. Pat. No. 5,473,599 and in the documentation to be found on the Oct. 15, 2001 under http://www.cisco.com/univercd/cc/td/doc/product/lan/ cat6000/sft$_{13}$6$_{13}$1/configgd/redund.htm are explained an alternative to guarantee high availability using Hot Standby Router Protocol HSRP. In that case, a system database is maintained on an active supervisor engine (in our case a router) and updates are sent to a standby supervisor engine (an adjacent router) for any change of data in the system database. The active supervisor engine communicates and updates the standby supervisor engine when any state changes occur, ensuring that the standby supervisor engine knows the current protocol state of supported features. A synchronization of each database, among other the routing tables, must be performed. The standby supervisor engine is isolated from the system bus and does not switch packets. But it does receive packets from the switching bus to learn and populate the routing table. The standby supervisor engine does not participate in forwarding any packets and does not communicate with any modules.

When using HSRP, it may be convenient to use also Virtual Router Redundancy Protocol VRRP as discussed at the IETF and to be find on the Oct. 15, 2001 under http://www.ietf.org/html.charters/vrrp-charter.html. In that case, each element of the network in an HSRP group will share a virtual IP address and MAC (media access control) address. In other words, several routers on a LAN (Local Area Network) on a multi-access link will be able to use the same virtual IP address. One router will be elected as a master with the other routers acting as backups in case of the failure of the master router. The master will forward packets sent to these IP addresses. The election process provides dynamic fail over in the forwarding responsibility should the master become unavailable. This allows any of the virtual router IP addresses on the LAN to be used as the default first hop router by end-hosts. The advantage gained from using VRRP is a higher availability default path without requiring configuration of dynamic routing or router discovery protocols on every end-host. But it is based on the use of different routers on a LAN i.e. at least two, one for the master and one for the backup, and each of these routers being independent server platform, a very costly engine.

SUMMARY OF THE INVENTION

It is an object of the present invention to provide high availability of routing of IP packets at the lowest possible cost.

This object is attained by a router device for IP—Internet Protocol—routing having an active routing daemon running on a processor board connected to a forwarding engine containing at least two outgoing ports and forwarding incoming IP packets from neighbor routers to said routing daemon or outgoing IP packets from said routing daemon to neighbor routers whereby said forwarding engine when forwarding said incoming IP packets replaces in unicast regime destination addresses of its outgoing ports in IP packets with virtual one of said active routing daemon and when forwarding said outgoing IP packets replaces in unicast as well as multicast regimes virtual source addresses of said active routing daemon in IP packets with the addresses of its outgoing ports. Furthermore, its object is also achieved by a method for forwarding IP—Internet Protocol—packets from neighbor routers to some active routing daemon or outgoing IP packets from said active routing daemon to neighbor routers by a forwarding engine containing at least two outgoing ports and connected to some router device for IP routing containing said active routing daemon running on a processor board while when forwarding said incoming IP packets in unicast regime, destination addresses of said outgoing ports in IP packets are replaced by virtual one of said active routing daemon or when forwarding said outgoing IP packets in unicast as well as multicast regimes, virtual source addresses of said active routing daemon in IP packets are replaced with the addresses of said outgoing ports.

It is advantageously taken profit of the possibility when using a forwarding engine physically separated from the active routing daemon to let that forwarding engine replacing addresses of some IP packets by virtual ones such to mask the real routing daemon. This is of particularly importance when the router device has several outgoing ports. It is then used in unicast regime when said forwarding engine forwards incoming IP packets from neighbor routers to said routing daemon. It is also used in unicast as well as in multicast regime when said forwarding engine forwards outgoing IP packets from said routing daemon to neighbor routers.

In another embodiment, a standby routing daemon is advantageously used on another processor by affecting same virtual addresses for its ports as the first active routing daemon. In a case of failure of the first active routing daemon, a controller will then switch said standby routing daemon to be the new active daemon connected to the forwarding engine.

In a further embodiment, it is taken advantage of the use of a CompactPCI (Peripheral Component Interconnect) bus. In that case, the forwarding engine is a peripheral board of the controller of the CompactPCI. And the processors on which the routing daemon are running are directly connected to that CompactPCI bus.

Further advantageous features of the invention are defined in the dependent claims and will become apparent from the following description and the drawings.

BRIEF DESCRIPTION OF THE DRAWINGS

One embodiment of the invention will now be explained in more details with reference to the accompanying drawings, in which.

DETAILED DESCRIPTION OF PREFERRED EMBODIMENTS

Figure 1:
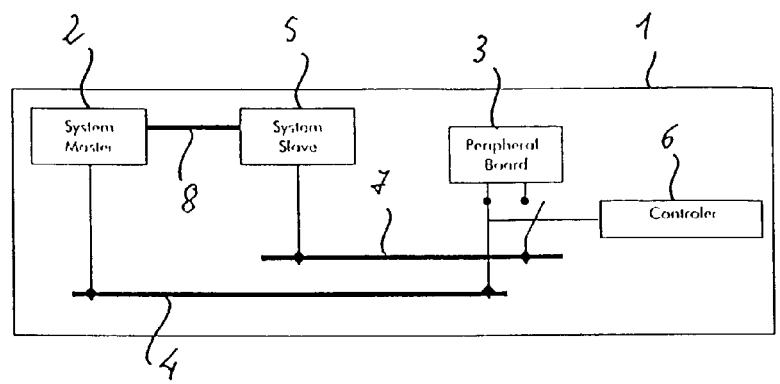
FIG. 1 is a schematic view of an hardware architecture according to the invention.

On FIG. 1 is depicted a router device 1 usually with several outgoing (Input/Output) ports and connected to some network for forwarding IP packets. Such router device 1 contains a processor board 2 on which is running an active routing daemon—system master. This processor board 2 is directly connected through some bus 4 to a forwarding engine 3—peripheral board.

The forwarding engine 3 is set such that it forwards incoming IP packets from neighbor routers to said active routing daemon or outgoing IP packets from said active routing daemon to neighbor routers. This can occur mainly in two different modes i.e. in unicast or multicast, latter encompassing broadcast mode. In the later protocol IPv6, it exists also anycast mode which is encompassed in the present invention by unicast. Unicast mode means that a communication occurs via a point-to-point communication. Anycast refers to the ability of a device to establish a communication with the closest member of a group of devices, in our cases routers of a network. By way of example, a host might establish a communication with the closest member of a group of routers for purposes of updating a database like a routing table. That router would then assume responsibility for retransmitting that update to all members of the router group on the basis of a multicast. More generally, multicast mode is the case when a broadcasting of messages is performed to a selected group of devices on a LAN, WAN or the Internet. It is a communication between a single device and multiple members of a device group.

According to the present invention, the forwarding engine 3 when forwarding incoming IP packets from neighbor routers to the routing daemon-system master-, will replace in unicast regime destination addresses of its outgoing ports in IP packets with virtual one of said active routing daemon. And when forwarding outgoing IP packets from said routing daemon to neighbor routers, will replace in unicast as well as multicast regimes, virtual source addresses of said active routing daemon in IP packets with the addresses of its outgoing ports.

Usually, the addresses which are of concern in the present invention—not exclusively—are the IP addresses and/or the MAC (media access control) addresses. An IP address is a network layer address for a device operating in the IP suite of protocols. The IP address is typically a 32 bit field or even 128 bit under IPv6, at least a portion of which contains information corresponding to its particular network segment. A MAC address is an address of a device at the sublayer of the data link layer. It is generally intended to apply to a specific physical device no matter where it is plugged into the network. Thus, a MAC address is generally hardcoded into the device—on a router's ROM, for example. In the present case, the addresses which are replaced by the forwarding engine (3) will be preferably the IP- and/or MAC addresses.

In FIG. 1 is furthermore pictured the router device 1 with a second processor board 5—system slave—on which is running a standby routing daemon. The second processor board 5 is firstly connected to the processor board 2 via a specific bus connection 8. All the updates of the database will occur through such bus connection 8, particularly the routing table allowing in case of necessity a very fast takeover of the standby routing daemon to become the new active routing daemon. This takeover is performed by a controller 6 which is connected with the bus 4 as well as a specific bus 7 directly connected with the second processor board 5. In case of a failure of the active routing daemon, the controller 6 will switch the standby routing daemon to be the new active daemon connected then via its specific bus 7 to the forwarding engine 3. The previously active daemon may then become the new standby routing daemon if the failure was not irreversible. If necessary, the previously older active daemon can be disconnected from the forwarding engine 3 by the controller 6 almost at the same time as the standby daemon is connected to the forwarding engine 3. In any case, the takeover will take only few ms which has to be compared with the 30 to 90 s in previous cases, it means almost no lost of packets to be forward will be noticed.

Instead of using two different routers for the active as well as the standby supervisor engine, it may be of interest to use two different system boards of the same CompactPCI (Peripheral Component Interconnect). This will substantially lower the price of such architecture. In that case, the two processor boards 2 and 5 on FIG. 1 are two system boards of this CompactPCI, the controller 6 is the controller of this CompactPCI and the forwarding engine 3 is a peripheral forwarding of that controller 6. An Ethernet over Compact-PCI driver may be used to communicate between the two different boards 2, 5 using the bus 8. This driver may affect automatically MAC address to each system board, particularly, it can affect the same MAC address. Moreover, it is possible to set the IP addresses of the two system boards to the same value.

Figure 2:
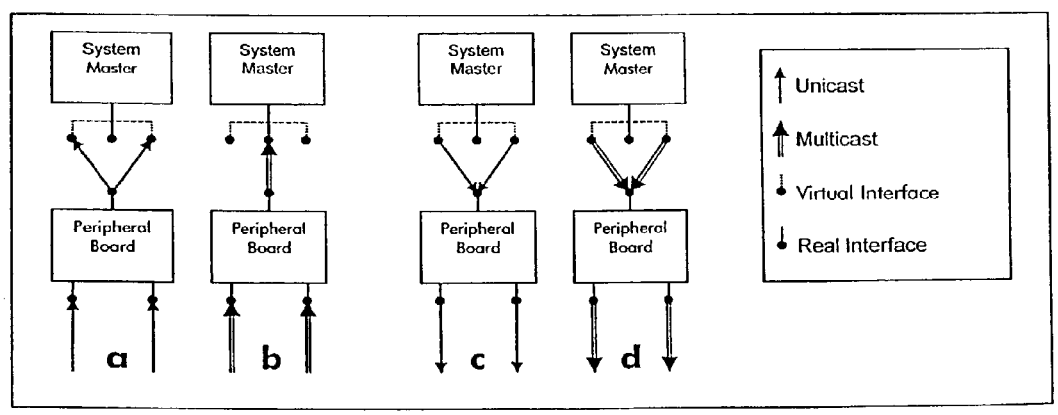
FIG. 2 is a schematic view of control packets flows.

In FIG. 2 are shown four different situations of control of packets flow according to the present invention. The peripheral board is the forwarding engine 3 with two real physical outgoing ports, and the system master is the active routing daemon with one real physical outgoing port. Furthermore, some virtual interfaces are created on the processor boards 2, 5 of the system master to simulate the real outgoing interfaces (Input/Output) of the forwarding engine 3. Here, two virtual interfaces of the system master are depicted to match the number of the real outgoing ports of the forward engine 3. But the number of real ports is only indicative and can be more then two. The routing protocol daemon can then be run with only few minor modifications. A packet analyzer software running on the peripheral board (forwarding engine 3) will be used to forward and mask the control packets for routing protocols such to redirect the packets in order to let the external networks and routing protocol daemon from neighbor routers believing that the packets are located on the peripheral board.

In the cases a and b are depicted the situations for incoming IP packets from neighbor routers to the active routing daemon. In unicast regime—a—the forwarding engine 3 forwards incoming packets to the virtual interface of the system master by modifying the IP and MAC addresses to match the one of the processor board target interface of the system master. In multicast regime—b—the forwarding of the incoming packets to the real interface of the system master occurs without any change of addresses.

In the cases c and d are depicted the situations for outgoing IP packets from the active routing daemon to neighbor routers. This time, in both regimes unicast as well as multicast one, respectively case c and d, the forwarding of packets to the outgoing interface of the peripheral board (forwarding engine 3) will take place by matching with the virtual interface where the packet is coming from. For that, the IP as well as the MAC addresses are modified to match with the outgoing interfaces.

The use of such method where destination addresses IP packets to be forward may be replaced allows to have a redundant routing daemon running on a separate board acting as a standby one. This is achieved with a minimal intrusion in the routing protocol code. In such a way, it is possible in case of failure to restart routing protocols i.e. switch from active routing daemon to the standby routing daemon without warning neighbor routers.

The invention claimed is:

1. A router device for Internet Protocol (IP)-routing comprising:
    an active routing daemon running on a processor board; and
    a forwarding engine connected to the processing board and comprising at least two outgoing ports, the forwarding engine is configured to forwards incoming IP packets from neighbor routers to said routing daemon and outgoing IP packets from said routing daemon to the neighbor routers;
    at least one additional routing daemon acting as a standby router running on a different processor board with same affected virtual addresses for its ports as said active routing daemon; and
    a controller, which when a failure of said active daemon occurs, switches said standby routing daemon to be new active daemon connected to said forwarding engine,
    wherein, when said forwarding engine forwards said incoming IP packets, said forwarding engine replaces destination addresses of the outgoing ports in IP packets with a virtual address of said active routing daemon only in a unicast mode, and
    wherein, when said forwarding engine forwards said outgoing IP packets, said forwarding engines replaces virtual source addresses of said active routing daemon in IP packets with the addresses of the outgoing ports in the unicast mode and in a multicast mode.

2. The router device according to claim 1, wherein the replaced addresses are at least one of IP—addresses and a Media Access Control (MAC) addresses.

3. The router device according to claim 1, wherein said processor board is interconnected with neighbor routers via a compact Peripheral Component Interconect (PCI)-bus while said forwarding engine is a peripheral board connected to said compactPCI bus.

4. The router device according to claim 1, wherein said active routing daemon and said standby routing daemon are connected with each other through a connection for data transfer and wherein said active routing daemon is synchronized with said standby routing daemon.

5. The router device according to claim 4, wherein said connection between said active routing daemon and said standby routing daemon is controlled by a driver on said controller which assigns the same addresses to said active routing daemon and said standby routing daemon.

6. The router device according to claim 5, wherein said controller comprises a compact Peripheral Component Interconnect-PCI bus and said forwarding engine is a peripheral board of said controller.

7. A method for forwarding Internet Protocol-(IP) packets comprising:
    forwarding by a forward engine incoming IP packets from neighbor routers to an active routing daemon; and
    forwarding by the forwarding engine outgoing IP packets from said active routing daemon to said neighbor routers, the forwarding engine comprises at least two outgoing ports and is connected to said active routing daemon running on a processor board,
    wherein, when the forwards in a unicast mode said incoming IP packets in, destination addresses of said outgoing ports in IP packets are replaced by a virtual address of said active routing daemon,
    wherein, when the forwarding engine forwards said outgoing IP packets in one of the unicast mode and in a multicast mode, virtual source addresses of said active daemon in IP packets with the addresses of said outgoing ports, and
    wherein, when a failure of said active daemon occurs, a switch occurs to a standby routing daemon running on an another processor board and said standby routing is assigned same virtual addresses as said active routing daemon, while said standby routing daemon is new active daemon connected to said forwarding engine.

8. The method according to claim 7, wherein the replaced addresses are at least one of IP—addresses and Media Access control-(MAC) addresses.

9. The router device according to claim 1, wherein the controller is connected to a bus connecting the forwarding engine and the active routing daemon and to a bus connecting the standby routing daemon to the forwarding engine and wherein, when failure of the active routing occurs, the controller activates the standby routing daemon and disconnects the forwarding engine from the active routing daemon.

10. The router device according to claim 9, wherein the controller physically disconnect the active daemon at substantial same time as physically connecting the standby routing daemon to the forwarding engine.

11. The router device according to claim 1, wherein, when said forwarding engine forwards said incoming IP packets, said forwarding engine does not replace the destination addresses of the outgoing ports in IP packets with a virtual address of said active routing daemon, in the multicast mode.

12. The router device according to claim 1, wherein the active routing daemon is connected to the standby routing daemon via a dedicated bus that forwards update control information from the active routing daemon to the standby routing daemon.

* * * * *